US008043674B2

(12) United States Patent
Rehkugler et al.

(10) Patent No.: US 8,043,674 B2
(45) Date of Patent: Oct. 25, 2011

(54) SEALABLE PACKAGING STRUCTURES AND APPLICATIONS RELATED THERETO

(75) Inventors: Richard Alan Rehkugler, Ontario, NY (US); Salvatorf J. Pellingra, Newport, KY (US); George F. Cretekos, Farmington, NY (US); Benoit Ambroise, Hachy (BE)

(73) Assignee: ExxonMobil Oil Corporation, Irving, TX (US)

( * ) Notice: Subject to any disclaimer, the term of this patent is extended or adjusted under 35 U.S.C. 154(b) by 185 days.

(21) Appl. No.: 11/522,263

(22) Filed: Sep. 15, 2006

(65) Prior Publication Data
US 2011/0129681 A9  Jun. 2, 2011

Related U.S. Application Data

(63) Continuation-in-part of application No. 11/096,298, filed on Apr. 1, 2005, now Pat. No. 7,537,829, which is a continuation-in-part of application No. 10/079,662, filed on Feb. 20, 2002, now abandoned, which is a continuation-in-part of application No. 09/791,325, filed on Feb. 22, 2001, now abandoned.

(51) Int. Cl.
*B29D 22/00* (2006.01)

(52) U.S. Cl. ............. 428/35.7; 428/35.2; 428/34.3; 428/35.8; 428/36.1

(58) Field of Classification Search ............ 428/35.7, 428/35.2, 34.3, 35.8, 36.1
See application file for complete search history.

(56) References Cited

U.S. PATENT DOCUMENTS

| | | | |
|---|---|---|---|
| 3,120,335 A * | 2/1964 | Egleston et al. ............. 229/117 |
| 5,888,648 A | 3/1999 | Donovan et al. ............. 428/349 |
| 6,326,068 B1 | 12/2001 | Kong et al. ............. 428/35.2 |
| 6,528,173 B1 | 3/2003 | Buzio et al. |
| 6,534,137 B1 | 3/2003 | Vadhar ............. 428/34.9 |
| 6,624,247 B2 | 9/2003 | Kume et al. ............. 525/88 |
| 6,641,913 B1 | 11/2003 | Hanyu et al. ............. 428/349 |
| 2002/0164470 A1 | 11/2002 | Bader ............. 428/216 |
| 2003/0211298 A1 * | 11/2003 | Migliorini et al. ......... 428/195.1 |
| 2004/0067288 A1 | 4/2004 | Wu et al. |
| 2005/0238874 A1 * | 10/2005 | Pellingra et al. ............. 428/349 |

FOREIGN PATENT DOCUMENTS

| | | |
|---|---|---|
| EP | 1283242 | 2/2003 |
| EP | 1543956 | 6/2005 |
| WO | WO 2005/097492 | 10/2005 |

OTHER PUBLICATIONS

U.S. Appl. No. 11/248,838, filed Oct. 12, 2005, entitled "Multi-Layer Films, Methods of Manufacture and Articles Made Therefrom", Inventors: Keung et al.

USSN: Not Yet Assigned, filed Sep. 15, 2006, entitled "Polymer Films and Methods of Producing and Using Such Films", Inventors: Rehkugler et al.

* cited by examiner

*Primary Examiner* — Rena Dye
*Assistant Examiner* — James Yager
(74) *Attorney, Agent, or Firm* — Robert L. Abdon

(57) ABSTRACT

Heat-sealable, multi-layer composite packaging structures that are suitable for packaging and having improved sealing properties and simplified construction as compared to prior art composite film constructions are disclosed. The inventive film structure includes a first substrate, such as paper, bonded such as by extrusion lamination, to a sealable, high-barrier film. This inventive "paper-adhesive-polymer" lamination may replace prior art "paper-adhesive-foil-adhesive" foil-based tandem laminations. An improved or comparable polymer film substrate may replace the "foil-adhesive" layer components of the popular incumbent prior art structure.

17 Claims, No Drawings

SEALABLE PACKAGING STRUCTURES AND APPLICATIONS RELATED THERETO

CROSS-REFERENCE TO RELATED APPLICATIONS

This application is a continuation-in-part of Ser. No. 11/096,298 filed Apr. 1, 2005 now U.S. Pat. No. 7,537,829, which is a continuation-in-part of Ser. No. 10/079,662 filed Feb. 20, 2002 now abandoned, which is a continuation-in-part of Ser. No. 09/791,325, filed Feb. 22, 2001, now abandoned.

TECHNICAL FIELD

This invention relates generally to composite heat-sealable packaging films structures including a multi-layer polymer film web substrate and another substrate therein. At least one of the substrates is at least in part, polymer-film based. More specifically, this invention relates to a composite packaging film structure that includes a multi-layer polymer film that contains first polymer components in a core layer and in a tie layer of the multi-layer film. The first polymer components have a particular range of properties that may impart improved seal properties to the composite film structure. The composite structure also facilitates replacement of a traditional incumbent prior art sealable high barrier packaging structure with an improved or alternative packaging structure.

BACKGROUND OF THE INVENTION

Multi-layer polymer films are widely used in packaging applications, such as bags and pouches for granular, particulate, individual, powder and liquid type products. Some common examples may include cereals, pet foods, snack foods, cookies, chips, seeds, fertilizers, etc. Many of these products are packaged mechanically at high speed for sale or distribution from bulk supplies. Multi-layer films must have the ability to form reliable seals at relatively high speed and appropriate temperature and, in some instances the film must do so in the presence of contamination in the seal region, due to the contents of the package. In many packaging applications involving dry powder or granular products, such as cake mixes, dry soup mixes, powdered drink mixes, hot chocolate mixes, and spices, a preferred packaging method has been a composite, laminated structure comprising a printable, outer paper web that is laminated to a foil layer and includes a second lamination of an inner seal layer on the side of the foil opposite the paper layer. Such incumbent structures are sometimes referred to as a traditional "paper/adhesive/foil/adhesive" structure or sometimes as a "paper/poly/foil/poly" structure. Typically, the "poly" in such structures is a polyethylene polymer.

In such composite packaging structures, the paper layer functions to provide a printable interface and a non-extensible web that can withstand the high stress forces applied as the structure is run through pouch and packaging machines at high speed and in the presence of high temperatures. Additionally, the paper layer functions to withstand the very high sealing temperatures required for sealing the relatively thick composite structures at high speed.

The foil is provided as a barrier layer. Foil has commonly been recognized as a barrier material, having transmission rates with respect to oxygen, water, flavor, aroma, and light of near zero, when in flat, undamaged form. However, in practice the foil layer is subject to flex cracking, pin-holing, crazing, and scratching in the packaging structure, and additionally to further deterioration and damage in the seal area due to the sealing function. The foil is also not very elastic and is subject to damage during film stretching or deformation. These defects may result in severely impaired performance as compared to flat foil substrate performance, leading to decreased shelf life and product spoilage. The failure of the foil layer can occur during the packaging process and during the distribution cycle for storage and retailing.

The inside or product-side adhesive or polymer layer typically functions as the sealable layer and is commonly a sealable polymer containing polyethylene, such as an olefin copolymer or terpolymer containing polyethylene and/or butylene. In some common prior art embodiments the inside sealable layer comprises a layer of extruded, high density polyethylene polymer that provides an acceptable seal strength along with an acceptable degree of leak-proofing in the seal area.

The polymer layer positioned between the paper substrate and the foil layer typically functions as an adhesive to bond the paper and foil. This layer is commonly a coextruded polymer layer, such as polyethylene, that is used as a coextrusion lamination adhesive.

To approach the performance of the paper/poly/foil/poly product without relying upon the fragile foil layer or without the need to perform two extrusions of polymer to laminate and provide a seal layer, some packaging applications may instead utilize just a multilayer polymer film. Flexible packaging polymer films may be treated on an outer surface to permit printability, treated and metallized on an opposing inner surface of the film to provide the barrier performance, and thereafter coated or laminated to an inner polymer seal layer or seal-coating. However, these metallized, coated films are not without their own limitations, such as sensitivity to high temperature at high speed, lack of bond strength of the metallized layer, seal strength concerns, hermeticity concerns, package stiffness concerns, and requiring the separate step of applying a sealant layer to the metal layer. Even with enhanced surface treatment and preparation, the metal layer may be subject to delamination and may require special quality control and handling to ensure consistent application. Further, the metallized layer may still suffer the other deficiencies of foil and may be especially sensitive to scratching and related defects as compared to foil.

Other sealable polymer films useful for packaging are also known in the art. For further example, U.S. Pat. No. 6,624,247 B1 to Kume et al. (Sumitomo Chemical Company, Ltd.) discloses a polypropylene-based heat-sealable film having reduced minimum seal temperature. U.S. Pat. No. 6,641,913 B1 to Hanyu et al. (Fina Technology, Inc.) discloses a multi-layer polyolefin film of the type suitable for packaging application in which heat seals are formed. The multi-layer film comprises a substrate layer formed of a crystalline thermoplastic polymer having an interface surface. A heat-sealable surface layer is bonded to the interface surface of the substrate layer and is formed of a syndiotactic propylene polymer effective to produce a heat seal with itself at a sealing temperature of less than 110° C. (230° F.). U.S. Pat. No. 6,534,137 B1 to Vadhar (Cryovac, Inc.) discloses a two-component laminated multi-layer film suitable for use in packaging articles, such as pet food, comprising a first component and a non-heat-shrinkable second component. U.S. Pat. No. 5,888,648 to Donovan et al. (Mobil Oil Corporation) discloses a multi-layer film which has an improved composite structure for packages manufactured in a high speed packaging apparatus. U.S. Pat. No. 6,326,068 to Kong et al. (Mobil Oil Corporation) discloses a multi-layer film that has an improved composite structure for providing hermetic seals to packages manufactured in a high speed packaging apparatus.

The structure of the multi-layer film includes layers A/B/C/D. Skin layer A is formed from polypropylene copolymer with melt flow rate greater than one or linear high density polyethylene with melt index greater than one. Core layer B is formed from polypropylene. Intermediate layer C has the primary function of compliance during sealing, and sealing layer D has the primary function of providing adhesivity to the completed seal.

Related U.S. application Ser. No. 10/079,662 to Bader, filed on Feb. 20, 2002, discloses a core layer B that comprises a softening additive blended in a core layer to improve the hermeticity of a sealed package. The softening additive enhances compliance of the core layer with the sealable layer while the seal area is heated under pressure within the crimp jaws during sealing operations. The invention of the '662 application functions during sealing operations to effect a more hermetic seal. It is possible to improve hermeticity as per the '662 application without necessarily, substantially improving minimum seal strength.

Though each of the above films represented a variety of improvements related to packaging films, none of the above films combine desired improvements in processability, seal strength, impact strength, hermeticity, durability, and sufficiently reduced seal temperatures for some of today's challenging packaging operations. Opportunities exist for composite, laminated polymer films to replace other packaging composite substrates, such as those including paper and foil, in many demanding packaging operations, such as with ice cream bars, chocolate bars, powders, and other dry-particulate foods.

In many flexible packaging applications, it remains desirable to eliminate the foil layer in the incumbent packaging structures, to provide acceptable barrier properties and hermeticity, to reduce costs and time required to prepare the double-laminated incumbent structures, and to provide a packaging structure that may be microwavable. It is also desirable in some applications to have a polypropylene-based composite packaging structure that does not rely on polyethylene or other adhesive-type polymers for sealability, hermeticity, and seal strength. The inventive composite film meets these and other needs.

SUMMARY OF THE INVENTION

The present invention primarily relates to a composite packaging film structure comprising an outer web substrate, such as paper, adhered to a multi-layer film. The inventive structure may provide improved or comparable barrier properties, seal temperature, and seal strength, as compared to some incumbent prior art composite packaging films, and that further may provide a more simplified packaging film than many of the films that are used in the prior art. In one embodiment, the first substrate is adhered to the second substrate by lamination. Among other advantages, this invention may facilitate replacing the inner "foil/poly" layer of the prior art "paper/poly/foil/poly" structure, with a poly layer that comprises a multilayer polymer film. The term "poly" as used herein is short for "polymer" and may be defined broadly to include polymer-based materials and substrates that are primarily composed of a thermoplastic material but which may also contain non-polymeric components, such as cavitating agents, anti-blocks, hydrocarbon resins, pigments, inks, coating materials, etc., and may refer to a mono-layer film substrate or to a multi-layer film substrate.

The inventive composite packaging film structure, methods, and related applications are disclosed and claimed, providing improved performance and cost effectiveness as compared to some prior art packaging structures and applications. The inventive packaging structure may comprise as one component thereof, a multi-layer flexible film. The multi-layer film substrate may include an arrangement of co-extruded polymeric layers that contribute individually and collectively to one or more of improved seal strength, impact strength, resilience, hermeticity, and reduced-temperature sealability of the film. More particularly, the inventive packaging film structure may replace the inner, "foil/poly" plies of the incumbent tandem extrusion laminations that are required to produce the traditional "paper/poly/foil/poly" laminations wherein the poly is typically PE. The two outer layers, e.g., the "paper/poly" layers, may still provide the benefits described previously.

As one advantage, the inventive replacement structure may provide foil-like barrier performance, without the flex cracking, pinhole, and related issues of foil and metallized polymers. As another advantage, the multi-layer film structure may also provide seal performance properties similar to the seal provided by polyethylene or other poly sealant layer that the inventive structure may replace. Also, the multi-layer film may provide the advantage of reducing the cost and time required to prepare the prior art structures, through the elimination of the step of applying the sealant poly layer to the foil. In addition to cost and time savings, the subject packaging structure may create opportunities for film converters that do not have tandem extrusion capability. Further, the inventive film structure may be more microwave heating tolerant than the incumbent structures. These and other objects, features, and advantages of the inventive composite packaging film structure are discussed in more detail in the following discussion, examples, and claims.

DETAILED DESCRIPTION OF THE INVENTION

In one preferred embodiment, the composite flexible packaging film structure of this invention may comprise at least: (a) a first substrate, preferably comprising a functional or application adapting material, such as paper; and (b) a second substrate comprising a multi-layer polymeric film, wherein the multi-layer polymer film component may include at least; (1) a core layer comprising from about 60 wt % to about 95 wt % of a core polymer and from about 5 wt % to about 40 wt % of a first polymer; (2) a tie layer comprising the first polymer and, optionally, a tie layer polymer, the optional tie layer polymer comprising at least one of a $C_2$-$C_8$ alpha-olefin homo-, co-, or terpolymer, a metallocene catalyzed homo-, co-, or terpolymer comprising propylene, and blends thereof; and (3) a sealant layer, the tie layer intermediate the core layer and the sealant layer, and the tie layer is on a side of the core layer opposite the first substrate; wherein the first substrate is adhered to the second substrate on a side of the second substrate opposite the tie layer. In one preferred embodiment, the first substrate may comprise a paper or paper-based substrate, the second substrate may comprise the multi-layer film, and the first substrate is laminated to the second substrate, such as by extrusion or adhesive lamination.

In other embodiments, the first substrate may comprise substantially any flexible substrate that may be suitable for use in a packaging film construction, such as paper, cloth, polymeric materials, cardstock, or coated paper. As printability is often a desired function for a surface of a packaging structure, many preferred embodiments may include a printable substrate as the first substrate, such as paper-based material or a treated or otherwise high-surface-energy polymeric material. The second substrate includes a multi-layer film component that comprises at least a core layer, a first tie layer, and a sealant layer. Each of the layers may function interactively to effect improved seal performance through an integration of layers that are collectively more pliable or compliant than prior art films, when subjected to the pressures of sealing jaws and when subjected to subsequent stresses on the seal, such as seal opening forces. This interactive relationship between the layers may assist in providing a commercially acceptable seal strength and hermeticity, and in some embodiments a seal that resembles the seal performance provided by prior art polyethylene seal layers. Polyethylene seals are known to have seal strengths up to 2000 g/in. The combined seal strength and hermetic properties demonstrated by the inventive polymer film structure may facilitate omission of both the (i) foil layer or metallized layer and (ii) the polyethylene sealant layer, as found in the incumbent prior art structures.

The combinations of polymers utilized in the tie and core layers of the multi-layer film may facilitate enhanced seal strength in a polypropylene-based seal film, by reducing the modulus of the core and tie layers and providing improved melt or flow characteristics of these layers during heat-sealing. The reduced modulus or improved elasticity of the film permits diffusion of force or stresses applied to the seal throughout the layers, thereby facilitating improved seal strength. Additionally, depending upon the particular resin component selection, some embodiments may also enjoy lowered minimum seal temperatures. Decreasing the melt temperature of the layers, including particularly the tie layer, may increase the degree of polymer chain entanglement and intermingling between the adjacent layers. Thus, the layers may realize improved bonding, delamination and destruction resistance, and improved flow during sealing within seal folds or creases, thereby effecting improved seal strength while simultaneously facilitating a reduced frequency of hermetic leak-paths in critical seal areas, such as seal corners, folds or creases. The terms "compliant" or "compliance" as used herein refer to the ability of the sealed area of film to deform or conform within the sealing jaws during sealing operations and additionally to elastically and/or plastically deform and diffuse stress throughout the multi-layer film substrate subsequent to sealing operations when the seal is subjected to stress. The first polymer permits each of at least a core layer, a tie layer, and a sealable layer to act synergistically with each other to dissipate stress throughout the layers. When force is applied to a seal of the sealable layer to itself, the film diffuses or dissipates the stress throughout each of the three layers by plastic deformation or compliance, instead of leaving the stress isolated or concentrated in the seal layer. A seal that dissipates the stress may generally facilitate a stronger seal than the same film having a concentrated stress region.

In the multi-layer films of this invention, one or more "first polymers" are blended or provided into at least the tie layer and the core layer to facilitate the improved seal strengths and, in some embodiments, reduced temperature sealing temperatures and low-temperature sealing properties. The first polymer used in the tie layer may be the same or different from the first polymer used in the core layer. It is only required that the subject first polymer included in each of the tie layer and the core layer fit the definition of a first polymer, as that term is herein defined. Preferably, the multi-layer films of the second substrate comprise the first polymer as a fractional component of the core layer and as a fractional or only component of the tie layer.

In some embodiments, such as in some clear film embodiments, the tie layer may comprise a relatively high percentage of the first polymer, such as at least about 90 wt % of first polymer, and in some embodiments the tie layer may comprise about 100 wt % of first polymer. In some opaque or white embodiments, the tie layer may comprise a blend of the first polymer and one or more tie layer polymers, wherein the first polymer may comprise, for example, about 10 wt % to about 30 wt % of the tie layer, based upon the total weight of the tie layer. The tie layer may also comprise multiple layers. A sealable layer is provided on the side of the tie layer opposite the core layer.

It is contemplated that further seal strength benefit may be realized in the seal area through improved bonding interaction between the core, tie, and seal layers. This improved bonding is a result of improved flowability of the first polymer, both within the layers comprising the first polymer and at the interface with the layers adjacent to first polymer containing layers, resulting in improved interlayer molecular intermingling at the layer interfaces. Benefits of the improved flowability manifest film improvement during both co-extrusion of the multi-layer film and also during sealing operations. As a result of the improved compliance, films according to this invention may provide improvements in seal strength integrity and improved hermetic sealing, particularly in the more leak-prone folds, creases, and seams in the seal area, due to the improved film conformability during sealing.

In one embodiment, the multi-layer film is a three-layer structure comprising a core layer, a first tie layer and a sealable skin layer. The core layer comprises a blend of at least one first polymer and a core polymer. The first tie layer comprises at least one first polymer and optionally a blend including a tie layer polymer blended with the first polymer. In another embodiment, the multi-layer film is a four-layer structure which further comprises an outer layer on a side of the core layer opposite the first tie layer and sealable layer.

In a preferred embodiment, the multi-layer film is a film having a five-layer structure comprising a core layer, first and second tie layers, a sealant layer, and an outer skin layer. The first tie layer is positioned between the core layer and sealant layer. The second tie layer is positioned between the core layer and the outer skin layer. The first polymer is provided in the core layer, the first tie layer and, optionally, in the second tie layer.

In yet another embodiment, the multi-layer film is a cavitated, white or opaque film due to the addition of a cavitating agent to the core layer or by beta-cavitation. The film may also be rendered white, opaque, or otherwise colored by the addition of dyes or pigments such as titanium dioxide to one or more of the layers. The composite flexible packaging structure may be used as a packaging film, further laminated to other films or substrates, and/or formed into a pouch or other package to enclose or contain a product or material.

The minimum seal temperature of the multi-layer films of this invention are preferably less than or equal to about 200° F. (93° C.), more preferably the minimum seal temperature is less than or equal to about 180° F. (82° C.), even more preferably the minimum seal temperature is less than or equal to about 176° F. (80° C.), and most preferably the minimum seal temperature is less than or equal to about 170° F. (76° C.), when a seal is formed by a crimp sealer of 200 gram weight, 20 psi pressure (138 kPa), and 0.75 sec. dwell time of the sealant layer to itself. Such minimum sealing temperatures are determined in accordance with methods described herein.

The seal strength of the multi-layer packaging film structures of this invention may be greater than about 500 grams/inch; preferably, the seal strength is greater than about 1000 grams/inch; and most preferably, greater than about 1500 grams/inch, when seals are formed using a crimp sealer at a temperature of at least 190° F. (88° C.) such seal strength determined in accordance with the methods described herein.

The films will preferably have a seal strength of greater than about 600 grams per inch for a seal formed on a crimp sealer at a temperature of at least 200° F. (93° C.). In some embodiments, the films according to this invention will have seal strength of at least 1000 grams per inch when sealed at a temperature of at least 200° F. (93° C.).

The detailed description below is given solely for the purpose of illustrating certain embodiments of the invention and should not be taken as limiting the present inventive concepts to these specific embodiments. To the extent that this description is specific to a particular embodiment, this is for purposes of illustration only and should not be taken as limiting the present inventive concepts to these specific embodiments.

"First" Polymers

As used herein, "first polymer" may be defined to include those homopolymers, copolymers, or polymer blends having at least one of the following sets of properties:

a) Density in the range of 0.850 g/cm³ to 0.920 g/cm³, a DSC melting point in the range of 40° C. to 160° C., and a MFR in the range of 2 dg/min. to 100 dg/min.; preferably, the DSC melting point ranges from 60° C. to 148° C., and in some embodiments, the DSC melting point more preferably ranges from 80° C. to 135° C.;

b) A propylene-ethylene copolymer including from about 75 wt % to about 96 wt % propylene, from about 4 wt % to about 25 wt % ethylene and having a density in the range of 0.850 g/cm³ to 0.900 g/cm³;

c) A flexural modulus of not more than about 2100 MPa and an elongation of at least 300%;

d) Isotactic stereoregularity, from about 75 wt % to about 96 wt % propylene, from about 4 wt % to about 25 wt % ethylene, (preferably from about 80 wt % to about 95 wt % propylene and from about 5 wt % to about 20 wt % ethylene; more preferably from about 84 wt % to about 94 wt % propylene and from about 6 wt % to about 16 wt % ethylene; and still more preferably from about 85 wt % to about 92 wt % propylene and from about 8 wt % to about 15 wt % ethylene), a DSC melting point in the range of from about 60° C. to about 148° C., a heat of fusion less than 75 J/g, crystallinity from about 2% to about 65%, and a molecular weight distribution less than or equal to about 3.2 and preferably from about 2.0 to about 3.2;

e) A polymer blend, comprising at least one polymer (A) and at least one polymer (B), polymer (A) comprising from about 60 wt % to about 98 wt % of the blend, and polymer (A) comprising from about 82 wt % to about 93 wt % of units derived from propylene and from about 7 wt % to about 18 wt % of units derived from a comonomer selected from the group consisting of ethylene and an unsaturated monomer other than ethylene, and polymer (A) is further characterized as comprising crystallizable propylene sequences, and polymer (B) comprising an isotactic thermoplastic polymer other than polymer (A); and f) A polymer blend, comprising at least one polymer (A) and at least one polymer (B), polymer (A) comprising from about 60 wt % to about 98 wt % of the blend, and polymer (A) comprising from about 65 wt % to about 96 wt % of units derived from propylene and from about 4 wt % to about 35 wt % of units derived from a comonomer selected from the group consisting of ethylene and an unsaturated monomer other than ethylene, and polymer (A) is further characterized as comprising crystallizable propylene sequences, and polymer (B) comprising an isotactic thermoplastic polymer other than polymer (A).

In addition to the above described definitions and descriptions of suitable first polymers, the polymers and polymer blends and/or compositions set forth below may further describe suitable or exemplary polymers or may describe suitable polymers with more particularity, such as by brand name and/or grade, provided such suitable or exemplary polymers confirm to one or more of the above definitional limitations of a "first polymer".

In some embodiments, the first polymer comprises $C_2C_3$ random copolymers, $C_2C_3C_4$ random terpolymers, impact copolymers, heterophasic random copolymers, $C_4$ homopolymers, $C_4$ copolymers, metallocene polypropylenes, propylene-based or ethylene-based elastomers and/or plastomers, or combinations thereof. In some preferred embodiments, the first polymer may be a grade of VISTAMAXX™ polymer or plastomer (commercially available from ExxonMobil Chemical Company of Baytown, Tex.). Exemplary grades of VISTAMAXX™ are VM6100, VM3000, VM 1000, and VM1100. In other preferred embodiments, the first polymer may be a suitable grade of one or more of VERSIFY™ polymer (commercially available from The Dow Chemical Company of Midland, Mich.), Basell CATALLOY™ resins such as ADFLEX™ T100F, SOFTELL™ Q020F, CLYRELL™ SM1340, CLYRELL™ RC1601 (commercially available from Basell Polyolefins of The Netherlands), PB (propylene-butene-1) random copolymers such as Basell PB 8340 (commercially available from Basell Polyolefins of The Netherlands), Borealis BORSOFT™ SD233CF, (commercially available from Borealis of Denmark), EXCEED™ 1012CA and 1018CA metallocene polyethylenes, EXACT™ 5361, 4049, 5371, 8201, 4150, 3132 polyethylene plastomers, EMCC 3022.32 low density polyethylene (LDPE) (commercially available from ExxonMobil Chemical Company of Baytown, Tex.), and JPC XPM 7800 and 7500 $C_2C_3C_4$ terpolymer (commercially available from Japan Polypropylene Corporation of Japan, ("JPC")), or a combination thereof. Other acceptable first polymers comprise a PB copolymer such as Shell SRD4-141 (commercially available from Shell Chemical Company).

In some embodiments, the first polymer may have a propylene content ranging from 75 wt % to 96 wt %, preferably ranging from 80 wt % to 95 wt %, more preferably ranging from 84 wt % to 94 wt %, most preferably ranging from 85 wt % to 92 wt %, and an ethylene content ranging from 4 wt % to 25 wt %, preferably ranging from 5 wt % to 20 wt %, more preferably ranging from 6 wt % to 16 wt %, most preferably ranging from 8 wt % to 15 wt %, based upon the weight of the tie layer.

The first polymer preferably has a density ranging from 0.850 g/cm³ to 0.920 g/cm³, more preferably ranging from 0.850 g/cm³ to 0.900 g/cm³, most preferably from 0.870 g/cm³ to 0.885 g/cm³.

In some embodiments, the first polymers will be a polyolefin co- or terpolymer having a melting point temperature equal to or less than about 288° F. (142° C.), more preferably equal to or less than about 248° F. (120° C.), and even more preferably for some embodiments, equal to or less than about 212° F. (100° C.). In other resin embodiments, the DSC melting point of the first polymer may range from 40° C. to 160° C., more preferably from 60° C. to 148° C., still more preferably below 135° C., such as from 60° C. to 135° C.

In some embodiments, the first polymer has a MFR ranging from 2 dg/min. to 100 dg/min., preferably ranging from 2.5 dg/min. to 50 dg/min., more preferably ranging from 2.5 dg/min. to 25 dg/min., most preferably from 2.5 dg/min. to 10 dg/min.

The first polymer may further have a molecular weight distribution (MWD) below 7.0, preferably ranging from 1.8 to 5.0, more preferably ranging from 2.0 to 3.2, most preferably, less than or equal to 3.2.

First polymers will most commonly include those polymers having a flexural modulus (ASTM D790) of less than about 80 Kpsi (550 MPa). Preferably, first polymers include those polymers having a flexural modulus of less than about 50 Kpsi (350 MPa), and for some embodiments a flexural modulus of less than about 20 Kpsi (140 MPa) is more preferred. Other preferred embodiments may have a flexural modulus of less than about 10 Kpsi (70 MPa) and sometimes a low as about 1 Kpsi (7 MPa). The flexural modulus of preferred first polymers may commonly fall within a range of values from about 2 Kpsi (14 MPa) to about 30 Kpsi (200 MPa).

The first polymers may also include those resins having a Vicat softening point (VSP) (ASTM D1525) of less than or equal to about 221° F. (105° C.), more preferably of less than or equal to about 176° F. (80° C.), and for some embodiments, most preferably of less than or equal to about 150° F. (65° C.).

The elongation of the first polymer may be preferably at least 300%, more preferably at least 400%, even more preferably at least 500%, and most preferably greater than 1000%. In some cases, elongations of 2000% or more are possible.

The latent heat of fusion of the first polymer preferably may be less than 75 J/g, more preferably less than 55 and still more preferably less than 30 J/g.

In some embodiments, the first polymer may have isotactic stereoregular crystallinity. In other embodiments, the first polymer has a crystallinity ranging from 2% to 65%.

The first polymer may be produced via a single site catalyst polymerization process. In some embodiments, the single site catalyst incorporates hafnium.

Acceptable first polymers may generally include polymer resins that are less stiff, have lower modulus, are more flexible and elastic, and tend to have a more elastic and/or plastic stress-strain behavior than the more common polymer film-forming resins such as isotactic polypropylene and high density polyethylene. Acceptable polymer resins also include, but are not limited to, resins having more elastic, amorphous-type functional properties as opposed to more crystalline-type functional properties.

For further example, an acceptable first polymer resin group includes, but is not limited to, impact copolymers or heterophasic copolymer polymer blends that typically contain from about 5 to 25 percent by weight of an elastomeric compound to incorporate rubber-like properties to the normally rigid backbone of polypropylene-based polymers or copolymers. Other heterophasic copolymers, such as those made by Basell's Catalloy™ process may contain over 25 wt % and even in excess of 50 wt % of elastomeric compound. For such exemplary polymers, the elastomeric component of the impact polymer may include, but are not limited to, acrylonitrile-chloroprene copolymer, acrylonitrile-isoprene copolymer, butadiene-acrylonitrile copolymer, chlorinated polyethylene, chlorosulfonated polyethylene, ethylene-ether polysulfite, ethylene-ethyl acrylate copolymer, ethylene polysulfite, ethylene-propylene copolymer, ethylene-propylene-diene terpolymer, fluoroelastomer, fluorosilicone, hexafluoropropylene-vinylidene fluoride copolymer, isobutene-isoprene copolymer, organopolysiloxane, acrylic ester-butadiene copolymer, polybutadiene, polychloroprene, polyepichlorohydrin, polyisobutene, polyisoprene, polyurethane, styrene-butadiene copolymer, styrene-chloroprene copolymer, polyethylene-butyl graft copolymer, styrene-butadiene-styrene triblock polymer, and blends thereof.

The other polymer component of the exemplary heterophasic copolymers may include, for example, ethylene- and propylene-based polymers including, but not limited to, polyolefins selected from the group consisting of propylene (PP) homopolymer, ethylene-propylene (EP) copolymer, ethylene-propylene-butylene (EPB) terpolymer, propylene-butylene (PB) copolymer, and blends thereof.

In addition to the exemplary heterophasic or Catalloy™ impact-type polymers, numerous other polymers or polymer blends are acceptable as the first polymer. For example, other acceptable polymers may include block copolymers, copolymers and terpolymers including $C_2$-$C_8$ alpha-olefins, and random copolymers. The acceptable first polymers may be the product of Ziegler-Natta or metallocene catalysis.

Core Layer

The core layer of a multi-layered film is typically the thickest layer and provides the foundation of the multi-layer polymer film of the second substrate. The core layer comprises a polymer blend of a core polymer, such as a propylene polymer, and at least one first polymer. The core layer comprises from about 60 wt % to about 95 wt % of a core polymer and from about 5 wt % to about 40 wt % of the first polymer. More preferably, the core layer comprises from about 65 wt % to about 93 wt % of the core polymer and from about 7 wt % to about 35 wt % of the first polymer. Still more preferably the core layer comprises from about 75 wt % to about 92 wt % of the core polymer and from about 8 wt % to about 25 wt % of the first polymer.

In preferred embodiments, the core polymer comprises propylene. In some preferred embodiments, the core polymer comprises isotactic polypropylene (iPP) homopolymer. The core polymer may also comprise ethylene, such as a high density polyethylene (HDPE) or a propylene-ethylene copolymer. The core layer may preferably comprise at least one polymer selected from the group consisting of propylene polymer, ethylene polymer, isotactic polypropylene (iPP), high crystallinity polypropylene (HCPP), ethylene-propylene (EP) copolymers, and combinations thereof. In one preferred embodiment, the core layer comprises an iPP homopolymer. An example of a suitable iPP is ExxonMobil PP4712E1 or ExxonMobil 4612 having a molecular weight distribution (Mw/Mn) of 5.8 (commercially available from ExxonMobil Chemical Company of Baytown, Tex.). Another suitable iPP is Total Polypropylene 3371 having a molecular weight distribution (Mw/Mn) of 4.8 (commercially available from Total Petrochemicals of Houston, Tex.). An example of HCPP is Total Polypropylene 3270 (commercially available from Total Petrochemicals of Houston, Tex.).

The first polymer is a key polymer in the function and performance of the core layer, the tie layer, the multi-layer polymeric film, and of the composite flexible packaging structure. The first polymer improves the compliance of the core layer both during and after sealing. Examples of acceptable first polymers were cited above in the "First Polymer" discussion above.

The core layer may preferably comprise at least 5 percent by weight of the core layer of the first polymer. Although the first polymer content in the core layer may comprise up to about 40 wt % of the core layer, preferably, the first polymer comprises from about 5 percent up to about 40 wt % of the core layer, more preferably at least 10 wt % of the core layer; and most preferably between about 10 and about 30 wt % of the core layer. Some embodiments may comprise from about 5 wt % to about 15 wt % of the first polymer.

The core layer may further comprise at least one additive such as an opacifying agent, void-initiating particles, a hydrocarbon resin, or combinations thereof. Preferably, the total amount of additives in the core layer, other than the first polymer, comprises up to about 20 percent by weight (20 wt %) of the core layer but some embodiments may comprise additives in the core layer in an amount up to about 30 percent by weight of the core layer, based upon the total weight of the core layer.

An opacifying or coloring agent may be used in the core layer, such as iron oxide, carbon black, aluminum, titanium dioxide ($TiO_2$), talc, and combinations thereof.

Cavitating or void-initiating particles may be added to the core layer polymer to create an opaque film. The cavitating or void-initiating additives include any suitable organic or inorganic material that is incompatible with the core layer polymer material at the temperature of biaxial orientation. Examples of suitable void-initiating particles are polybutylene teraphthalate (PBT), nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 μm. These void-initiating particles may be present in the core layer at less than 30 percent by weight; preferably less than 20 wt %; most preferably in the range of from 2-10 wt %, based on the total weight of the core layer. The core layer might alternatively be cavitated by beta-cavitation, preferably using a beta-nucleating agent.

The core layer, the first tie layer, and/or the optional second tie layer may include a hydrocarbon resin. Hydrocarbon resins may serve to enhance or modify the modulus, improve processability, or improve the barrier properties of the film. Examples of such hydrocarbon resins may be found in U.S. Pat. No. 5,667,902, incorporated herein by reference. The resin may be a low molecular weight hydrocarbon, which is compatible with the core polymer. Optionally, the resin may be hydrogenated. The resin may have a number average molecular weight greater than 5000; preferably greater than 2000; most preferably in the range of from 500-1000. The resin can be natural or synthetic and may have a softening point in the range of from 60°-180° C. (140°-356° F.). Examples of hydrocarbon resins include, but are not limited to, petroleum resins, terpene resins, styrene resins, and cyclopentadiene resins.

Examples of hydrocarbon resins that may be used include aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and mixtures of two or more thereof.

Hydrocarbon resins that may be suitable for use as described herein include EMPR 120, 104, 111, 106, 112, 115, EMFR 100 and 100A, ECR-373 and Escorez® 2101, 2203, 2520, 5380, 5600, 5618, 5690, available from ExxonMobil Chemical Company; ARKON™ M90, M100, M115 and M135 and SUPER ESTER™ rosin esters available from Arakawa Chemical Company of Japan; SYLVARES™ phenol modified styrene-á methyl styrene resins, styrenated terpene resins, ZONATAC terpend-aromatic resins, and terpene phenolic resins available from Arizona Chemical Company; SYLVATAC™ and SYLVALITE™ rosin esters available from Arizona Chemical Company; NORSOLENE™ aliphatic aromatic resins available from Cray Valley of France; DERTOPHENE™ terpene phenolic resins available from DRT Chemical Company of Landes, France; EASTOTAC™ resins, PICCOTAC™ $C_5/C_9$ resins, REGALITE™ and REGALREZ™ aromatic and REGALITE™ cycloaliphatic/aromatic resins available from Eastman Chemical Company of Kingsport, Tenn.; WINGTACK™ ET and EXTRA available from Goodyear Chemical Company, FORAL™, PENTALYN™, AND PERMALYN™ rosins and rosin esters available from Hercules (now Eastman Chemical Company); QUINTONE™ acid modified $C_5$ resins, $C_5/C_9$ resins, and acid modified $C_5/C_9$ resins available from Nippon Zeon of Japan; and LX™ mixed aromatic/cycloaliphatic resins available from Neville Chemical Company; CLEARON hydrogenated terpene aromatic resins available from Yasuhara; and Piccolyte. The preceding examples are illustrative only and by no means limiting.

One particular hydrocarbon resin may be referred to as a saturated alicyclic resin. Such resins, if used, may have a softening point in the range of from 85°-140° C. (185°-284° F.), or preferably in the range of 100°-140° C. (212°-284° F.), as measured by the ring and ball technique. Examples of commercially available saturated alicyclic resins are Arkon-P® (commercially available from Arakawa Forest Chemical Industries, Ltd., of Japan).

The amount of such hydrocarbon resins, either alone or in combination, in the core layer is less than 20 wt %; preferably in the range of from 1-5 wt %, based on the total weight of the core layer. Also, the core layer may comprise anti-static agents or migratory slip agents, such as fatty amides.

The core layer of embodiments of this invention preferably may have a thickness in the range of from about 5-50 μm; more preferably from about 5-25 μm; most preferably from 5-10 μm.

Tie Layer

The tie layer is preferably contiguous to the core layer and the sealant layer, although the tie layer may comprise multiple layers between the core and sealant layer. The tie layer, e.g., the first tie layer, is intermediate the core and sealant layers and may comprise a first polymer and optionally, one or more additional or tie layer polymers. Many preferred embodiments may comprise at least about 10 wt % of the first polymer, based upon the weight of the tie layer, preferably at least about 90 wt % of the first polymer, and more preferably about 100 wt % of the first polymer. When one or more optional tie layer polymers are also present in the tie layer, the preferred amount of the first polymer present may depend upon whether the film is a clear film or a cavitated opaque film. For clear embodiments comprising both a first polymer and a tie layer polymer, the first polymer may comprise at least about 10 wt % of the first polymer, preferably up to about 90 wt % of the first polymer, and more preferably up to about 95 wt % of the first polymer. Thereby, the tie layer polymers may comprise from about 5 wt % to about 90 wt % of the tie layer.

For cavitated opaque embodiments, the tie layer may preferably comprise from about 10 wt % to up to about 40 wt % of the first polymer, based upon the weight of the tie layer, and from about 90 wt % to about 60 wt % of the tie layer polymer. The first polymer may preferably be present in the tie layer in an amount of from about 10 wt % to about 40 wt % of the tie layer. More preferably the first polymer may be present in the tie layer from about 10 wt % to about 30 wt % of the tie layer. However, in some less preferred opaque embodiments, first polymer concentrations in the tie layer of less than 10 wt % (e.g., 10 wt %) or greater than 40 wt % (e.g., 40 wt % or about 90 wt % or more) are permissible, depending upon the processing or application properties desired for the packaging structure.

The optional tie layer polymers may comprise one or more $C_2$-$C_8$ alpha-olefin homopolymers, copolymers, or terpolymers, a metallocene catalyzed homo-, co-, or terpolymer (preferably comprising propylene), a metallocene catalyzed random copolymer, and blends thereof. Preferably, the additional polymer is comprised of at least one of an iPP homopolymer. An example of a suitable iPP homopolymer is Total Polypropylene 3371 (commercially available from Total Petrochemicals of Houston, Tex.).

In some embodiments, the first tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the first tie layer is typically in the range of from about 0.50 to 25 µm, preferably from about 0.50 µm to 12 µm, more preferably from about 0.50 µm to 6 µm, and most preferably from about 2.5 µm to 5 µm. However, in some thinner films, the first tie layer thickness may be from about 0.5 µm to 4 µm, or from about 0.5 µm to 2 µm, or from about 0.5 µm to 1.5 µm.

Sealant Layer

The sealant layer is on a side of the core layer opposite the side of the core layer that is adhered to the first substrate, and the tie layer is intermediate the core layer and sealant layer. In preferred embodiments, the sealant layer is contiguous to the tie layer, although in some alternative embodiments other layers may be present between the tie layer and sealant layer.

The sealant layer may also support a coating on the side of the sealant layer opposite the tie layer. The sealant layer may comprise substantially any suitable polymer as may be usefully used as a sealable layer in a polymer film. Preferably, the sealant layer comprises a polymer that has a reduced melting temperature as compared to more crystalline polymers and includes a polymer that is suitable for heat-sealing or bonding to itself when crimped between heated crimp-sealer jaws at the desired packaging speed. Commonly, suitable sealable layer polymers may include co- or terpolymers of ethylene, propylene, and butylene. In some preferred embodiments, the sealant layer comprises at least one polymer selected from the group consisting of Ziegler-Natta or metallocene catalyzed; polypropylene (PP) homopolymer, ethylene-propylene (EP) copolymer, propylene-butylene (PB) copolymer, an ethylene-butylene (EB) copolymer, ethylene-propylene-butylene (EPB) terpolymer, ethylene vinyl acetate (EVA), and blends thereof. The sealant layer may additionally or alternatively include materials selected from one or more of ethylene propylene random copolymers (EP rcp), low density polyethylene (LDPE), linear low density polyethylene (LLDPE), medium density polyethylene (MDPE), or combinations thereof.

The thickness of the sealant layer is typically in the range of from about 0.10-7.0 µm; preferably about 0.10-4 µm; and most preferably about 0.10-3 µm. In some film embodiments, the sealant layer thickness may be from about 0.10-2 µm; 0.10-1 µm; or 0.10-0.50 µm. In some commonly preferred film embodiments, the sealant layer has a thickness in the range of from about 0.5-2 µm, 0.5-3 µm, or 1-3.5 µm. The sealant layer may also comprise processing aid additives, such as anti-blocks, anti-stats, and slip agents.

Skin Layer

The polymer film of the second substrate may preferably comprise a skin layer. The skin layer is an optional layer and when present is provided on the opposite side of the core layer from the sealant layer. The skin layer is on the side of the core layer supporting the first substrate and in the composite packaging structure is intermediate the core layer and first substrate. The skin layer may be contiguous to the core layer or contiguous to one or more second side tie layers positioned between the core layer and the skin layer. The skin layer may be included to provide a surface on the second substrate that is suitable for laminating the second substrate to the first substrate. The skin layer may also improve the second substrate's barrier properties, processability, printability, and/or compatibility for metallization, and/or coating, if desired.

The skin layer may preferably comprise a polymer selected from the group consisting of a PE polymer, a PP polymer, an EP copolymer, an EPB terpolymer, an ethylene-vinyl alcohol (EVOH) polymer, and blends thereof. Preferably, the PE polymer is high-density polyethylene, such as HDPE, such as M-6211 and HDPE M-6030 (commercially available from Equistar Chemical Company); and HD-6704.67 (commercially available from ExxonMobil Chemical Company); and preferably the PP polymer is an EP copolymer, such as Total/Fina 8573 (commercially available from Total Petrochemical Corporation/Atofina). For coating and printing functions, the outer skin layer may preferably comprise a co- or terpolymer that has been surface treated. For metallizing, coating, or other enhancement of barrier properties, a HDPE, PP or EVOH may be preferred. A suitable EVOH copolymer is Eval G176B (commercially available from Kuraray Company Ltd. of Japan). In some preferred embodiments, the outer skin layer includes an adhesion promoting material, such as Admer AT1179A (commercially available from Mitsui Chemicals America Inc.), a maleic anhydride modified polypropylene.

The thickness of the skin layer depends upon the intended function of the skin layer, but is typically in the range of from about 0.50-3.5 µm; preferably from about 0.50-2 µm; and in many embodiments most preferably from about 0.50-1.5 µm. Also, in thinner film embodiments, the outer skin layer thickness may range from about 0.50-1.0 µm; or 0.50-0.75 or is about 0.50 µm.

Second Tie Layer

In some embodiments of the multi-layer films invention, an optional second tie layer is located on the side of the core layer opposite the first tie layer and sealant layer, between the core layer and the skin layer. The second tie layer is preferably contiguous to the core layer and the skin layer. In one embodiment, the second tie layer comprises a polymer blend of propylene homopolymer. In some alternative embodiments the second tie layer may also comprise a first polymer, as described above and the blends thereof, such as in the first side tie layer. The propylene polymer is preferably an iPP. Preferably, a first polymer comprises up to 90 percent by weight of the second tie layer, more preferably at least 10 percent by weight of the second tie layer, and most preferably between 10 and 90 percent by weight of the second tie layer.

The thickness of the second tie layer is in the range of from about 1-25 µm; preferably from about 1-12 µm; and most preferably from about 1-10 µm. Also, the thickness may be from about 0.5-8 µm; or 1-6 µm; or 1-4 µm.

Coating

In some embodiments, one or more coatings, such as for barrier, printing, adhesion, and/or processing, may be applied to one or both sides of the packaging structure. Exemplary coatings may include acrylic polymers, such as ethylene acrylic acid (EAA), ethylene methyl acrylate copolymers (EMA), polyvinylidene chloride (PVdC), poly(vinyl)alcohol (PVOH) and ethylene (vinyl)alcohol EVOH. The coatings are preferably applied by an emulsion coating technique, but may also be applied by co-extrusion and/or lamination. For example, a coating, such as PVdC may be applied to the sealant layer to further enhance the barrier properties of the packaging structure, without interfering with sealability properties. Coatings may be applied to the side of the core layer opposite the side of the core layer supporting the sealant layer, or to the skin layer if present, to enhance printability or bond strength of the lamination. Coatings may also be applied to either side of the first substrate if desired or deemed appropriate for the intended function.

A coating composition may be applied to the film as a solution, such as may include an organic solvent such as an alcohol, ketone, ester, and the like. However, since the coating composition may contain insoluble, finely divided inorganic materials which may be difficult to keep well dispersed in organic solvents, it is preferable that the coating composition be applied to the treated surface in any convenient manner, such as by gravure coating, roll coating, dipping, spraying, and the like. The excess aqueous solution can be removed by squeeze rolls, doctor knives, and the like. The film can be stretched in the machine direction, coated with the coating composition, and then stretched perpendicularly in the transverse direction. In yet another embodiment, the coating can be carried out after biaxial orientation is completed.

The coating composition may be applied in such amount that there will be deposited upon drying a smooth, evenly distributed layer, generally on the order of from 0.2-5 μm thickness (equivalent to 0.2-3.5 g per 1000 sq. in. of film). The coating on the film may subsequently be dried by hot air, radiant heat, or by any other convenient means.

Before applying the coating composition to the appropriate substrate, the surface intended to be coated may be treated if necessary to increase the surface energy of such surface before coating. This treatment may be accomplished by any suitable technique, such as, flame treatment, plasma, corona discharge, film chlorination, i.e., exposure of the film surface to gaseous chlorine, treatment with oxidizing agents such as chromic acid, hot air or steam treatment, flame treatment and the like. After treatment of the film surface, the coating composition may then be applied thereto.

In some high-barrier films, a high barrier coating, such as PVdC, may be applied. For example, PVdC coatings that may be suitable for use with the multi-layer polymeric films of this invention may include any of the known PVdC compositions employed as coatings in film manufacturing operations, e.g., any of the PVDC materials described in U.S. Pat. Nos. 4,214,039; 4,447,494; 4,961,992; 5,019,447; and 5,057,177, incorporated herein by reference.

Known vinyl alcohol-based coatings, such as PVOH and EVOH, that may be suitable for use with the multi-layer films invention include VINOL 125 or VINOL 325 (both commercially available from Air Products, Inc.). Other PVOH coatings are described in U.S. Pat. No. 5,230,963, incorporated herein by reference.

If appropriate for the intended materials and application, an intermediate primer coating may be applied to multi-layer film. In this case, the film may be first treated by one of the foregoing methods to provide increased active adhesive sites thereon and to the treated film surface there may be subsequently applied a coating of a primer material. Primer materials are known in the art and include, for example, epoxy and poly(ethylene imine) (PEI) materials. U.S. Pat. No. 3,753,769 to Steiner; U.S. Pat. No. 4,058,645 to Steiner; and U.S. Pat. No. 4,439,493 to Hein et al., each incorporated herein by reference, disclose the use and application of such primers. The primer provides an overall adhesively active surface for thorough and secure bonding with the subsequently applied coating composition and can be applied to the film by conventional solution coating means, for example, by roller application.

Film Production and Orientation

The polymeric film of this invention may be prepared by any suitable technique, such as by a blown film process or a cast film, tenter frame process and/or simultaneous stretching technology. Preferably the films are oriented in at least one direction and more preferably biaxially oriented, either sequentially or simultaneously. Orientation may be by any of the known orienting processes, such as blowing, sequential rolls, and/or tenter frame, depending upon the desired film manufacturing process and desired features. Preferred orientation ratios are commonly from between about three to about six in the machine direction and between about four to about ten in the transverse direction. Preferred second substrate film embodiments comprise coextruded core, tie, and sealant layers. It is preferred that other layers of the second substrate film are also coextruded with the core, tie, and sealant layers, however, such others layers may be laminated to form the second substrate.

Metallization

Though the inventive packaging structure comprises a second substrate that does not include any foil, preferred embodiments of the inventive substrate will include a metallized surface on either the polymeric film or the second substrate. Preferably the second substrate will be metallized on a side of the core layer opposite the first tie layer, such that the packaging structure is a high barrier structure. Such embodiments may provide enhanced barrier properties in the subject inventive packaging structure or barrier properties that are at least comparable with the barrier properties of the incumbent prior art high barrier sealable packaging substrates. A surface of the second substrate may be metallized such as by vapor deposition of a metal layer, such as aluminum.

Other Additives

Other additives that may be added to the multi-layer films of this invention, include, but are not limited to, pigments, colorants, anti-oxidants, anti-ozonants, anti-fogs, anti-stats, fillers, such as diatomaceous earth, combinations thereof, and the like. Such additives may be used in effective amounts, which vary depending upon the property required, and are, typically selected from one or more of anti-block, slip additive, anti-oxidant additive, moisture barrier additive or gas barrier additive.

Useful anti-static additives that may be used in amounts ranging from about 0.05 to 3 wt %, based upon the weight of the layer, include alkali metal sulfonates, polyether-modified polydiorganosiloxanes, polyalkylphenylsiloxanes, and tertiary amines.

Anti-blocking agents, such as a silica-based product such as Sylobloc 44 (commercially available from Grace Davison Products); polymethyl methacrylate (PMMA) particles such as EPOSTAR™; or polysiloxanes such as TOSPEARL™ are also contemplated. Such anti-blocking agents comprise an effective amount up to about 3000 ppm of the weight of the layer to which it is added.

Conventional slip additives include higher aliphatic acid amides, higher aliphatic acid esters, waxes, silicone oils, and metal soaps. Such slip additives may be used in amounts ranging from 0.1-2 wt % based on the total weight of the layer to which it is added. An example of a slip additive that may be useful for this invention is erucamide.

The sealant layer and/or the skin layer may also include a non-migratory slip agent, such as polymethyl methacrylate (PMMA). The non-migratory slip agent may have a (mean)

particle size in the range of from about 0.5-4 μm, or more preferably 0.5-8 μm, or 1-5 μm, or 2-4 μm, depending upon layer thickness and desired slip properties. Alternatively, the size of the particles in the non-migratory slip agent, such as PMMA, may be greater than 20% of the thickness of the sealant or outer skin layer containing the slip agent, or greater than 40% of the thickness of the layer, or greater than 50% of the thickness of the layer. The size of the particles of such non-migratory slip agent may also be at least 10% greater than the thickness of the sealant or outer skin layer, or at least 20% greater than the thickness of the sealant or outer skin layer, or at least 40% greater than the thickness of the sealant or outer skin layer. Generally spherical, particulate non-migratory slip additives are contemplated, including PMMA resins, such as EPOSTAR™, manufactured by Nippon Shokubai Co., Ltd. Other commercial sources of suitable materials are also known to exist. Non-migratory means that these particulates do not generally change location throughout the layers of the film in the manner of the migratory slip agents.

A conventional polydialkyl siloxane, such as silicone oil or gum additive having a viscosity of 10,000-2,000,000 centistokes is also contemplated.

Useful anti-oxidants are phenolic anti-oxidants, such as Irganox 1010 (commercially available from Ciba-Geigy Company). Such anti-oxidants are generally used in amounts ranging from 0.1-2 wt %, based on the total weight of the layer to which it is added.

Barrier additives may be used in effective amounts and may include low-molecular weight resins, hydrocarbon resins, particularly petroleum resins, styrene resins, cyclopentadiene resins, and terpene resins.

Optionally, the skin layers may be compounded with a wax or coated with a wax-containing coating, for lubricity, in amounts ranging from 2-15 wt % based on the total weight of the layer to which it is added. Any conventional wax, such as, but not limited to, Carnauba™ wax (available from Michelman Corporation, Cincinnati, Ohio) that is useful in thermoplastic films is contemplated.

Heat Seals

Heat seals useful in packaging are commonly lap, fin, or crimp seals. Most frequently, vertical form fill and seal and/or horizontal form fill and seal (VFFS and/or HFFS, respectively) useful in snack packaging will employ a fin seal and two crimp seals. Pouches typically comprise two, three, and four side seal pouches, sealed such as a fin seal, wherein a side of the film is sealed to the same side of the film. Standup pouches may also include folded fin, crimp, or pouch-type seals. For extended shelf life, a hermetic seal is desirable. A hermetic seal is generally one that does not permit the passage of a gas. A more hermetic-like seal will have a lower transmission value, such as to oxygen or other gas, vapor, aroma, moisture, or grease, than a seal that is less hermetic-like.

Methods

Packaging substrates and multi-layer films according to the present invention may be useful as substantially stand-alone film webs or they may be coated, metallized, and/or further laminated to other film structures. More preferably, the composite packaging substrates comprise first and second substrates according to this invention, that are laminated or otherwise combined with each other to form a composite, multi-substrate flexible packaging film that is sealable, and may be useful as a flexible packaging structure. The flexible packaging structure may be useful in one or more particular packaging applications. The packaging structures according to the present invention may be prepared by any suitable methods comprising the steps of co-extruding a multi-layer film according to the description and claims of this specification, orienting, and preparing the film for intended use such as by coating, printing, slitting, or other converting methods and laminating the substrate to another substrate, such as a coated paper substrate. Preferred methods comprise co-extruding, then casting and orienting, or blowing a five-layer film substrate, such as illustrated and discussed in the examples and in this specification, printing the substrate and thereafter laminated the printed and coated substrate to a first substrate such as coated paper or another polymer film, such as a polyester or nylon film.

A method of preparing a sealable, flexible packaging film structure, as described and claimed herein, may comprise the steps of: (a) providing a first substrate; (b) providing a second substrate, the second substrate comprising; (1) a core layer comprising from about 60 wt % to about 95 wt % of a core polymer and from about 5 wt % to about 40 wt % of a first polymer; (2) a tie layer comprising the first polymer and, optionally, a tie layer polymer, the optional tie layer polymer comprising at least one of a $C_2$-$C_8$ alpha-olefin homo-, co-, or terpolymer, a metallocene catalyzed homo-, co-, or terpolymer comprising propylene, and blends thereof; and (3) a sealant layer, the tie layer intermediate the core layer and the sealant layer, and the tie layer is on a side of the core layer opposite the first substrate; wherein the first substrate is adhered to the second substrate on a side of the second substrate opposite the tie layer; and (c) adhering the first substrate to the second substrate. In such method, the first polymer may have a density in the range of 0.850 g/cm$^3$ to 0.920 g/cm$^3$, a DSC melting point in the range of 40° C. to 160° C., and a melt flow rate in the range of 2 dg/min to 100 dg/min. In such method, the first polymer may preferably comprise at least one of an impact copolymer, random copolymer, random terpolymer, random PB copolymer, heterophasic random copolymer, and a Catalloy™ resin. The method may further comprise additionally co-extruding or laminating a skin layer and optionally a second tie layer on a side of the core layer opposite the sealant layer, along with the core layer, the first tie layer, and the sealant layer.

The prepared packaging film structure may be used as a heat sealable, flexible packaging film, such as to package an article or good, such as a food item or other product. In some preferred applications, the film may be formed into a pouch type of package, such as may be useful for packaging a beverage, liquid, granular, or dry-powder or other product. The structure may also be used in other applications, such as VFFS or HFFS packaging applications.

Property Measurement

Seal strength is a measure of the force required to separate a test strip of a material containing a seal and identifies the mode of failure of the test strip. The seal strength measurement is performed on an untreated surface that is sealed to itself.

Minimum seal temperature is a measure of the sealing property of a film and is the temperature at which a heat seal may support a given force.

Puncture resistance is a measure of the amount of force required to penetrate a film using a probe of a specified diameter.

Testing Methods

Seal strength may be determined using sealing devices such as a WRAPADE™ Crimp Sealer (Model J or K), ASKCO™ Heat Sealer (Model HST-09), and a LAKO™ Heat Sealer (Model SL-10). Also, the seal strength of flexible barrier materials may be determined according to the standard testing method of ASTM F 88-00.

The seal strength of a seal formed using the WRAPADE Crimp Sealer (Model J or K), commercially available from Wrapade Machine Co., Inc. of Clifton, N.J. is determined as follows: The WRAPADE crimp sealer is set to a dial pressure of about 20 psi (138 kPa), dwell time of 0.75 seconds. A multi-layer film specimen is prepared so that when two surfaces are placed together the resulting film is approximately 6.35 cm in the transverse direction by 7.62 cm in the machine direction. The specimen is then inserted squarely, smoothly, and flatly into the crimp sealer jaws so that a small amount protrudes beyond the back end of the jaws. The transverse direction of the specimen is parallel to the sealer jaws. The jaws are closed and immediately after the sealing bar rises the specimen is removed from the jaws of the sealer. A JDC-1-12 cutter (commercially available from Thwing Albert Instrument of Philadelphia, Pa.) is used to cut the specimen into a one inch strip. The amount of force needed to separate the seal is determined on an Alfred-Suter seal strength testing unit. The amount of force needed to pull the seal apart is recorded in grams per inch as the seal strength.

The seal strength of a seal formed using an ASKCO Heat Sealer (Model HST-09), commercially available from Askco Instrument Corp. of Houston, Tex. is determined as follows: The ASKO Heat Sealer is comprised of a multiple bar sealer having a pressure of up to 22 psi, a dwell time of 2 seconds, at a temperature that ranges from 200° F. to 280° F. To form a seal, a film sample is placed in the jaws of the sealer such that the desired surfaces are together (i.e., inside to inside or outside to outside). A seal is formed, for example, when the jaws are heated to a sealing temperature and then closed together at a seal pressure of 5 psi and a dwell time of 2 seconds. The seal strength is determined using the Alfred-Suter tester as noted above.

A LAKO™ Heat Sealer (Model SL-10), commercially available from Lako Tool & Manufacturing, Inc. of Perrysburg, Ohio, may be used to form a seal and evaluate its seal strength. The LAKO Heat Sealer is an automated film testing device which is capable for forming a film seal, determining the seal strength, and generating a seal profile from film samples. The operating range is from ambient to 390° F. (199° C.), sealing pressure of 6.5-390 psi, and a dwell time of 0.2-20 sec. Samples are cut to desired size, placed in the desired sealing position with respect to each other, and then loaded into the sample loading tray. The tray then automatically inserts the samples into the SL-10, which then crimps or otherwise applies selected pressure and heat for the selected duration of time to form the seal. The SL-10 then tests the seal strength according to any of various testing programs available.

The minimum seal temperature is determined as follows: Heat seals are formed using one of the above heat sealers at temperatures that are raised incrementally. The minimum seal temperature is reached when one temperature yields a seal value of less then a specified grams/inch peel force and the next temperature yields a seal value of greater than or equal to the specified grams/inch peel force. In the case of the WRAPADE™ Crimp Sealer, the specified peel force is 200 grams per inch. With respect to the ASKCO™ Heat Sealer and the LAKO™ Heat Sealer, the specified peel force is 100 grams per inch.

The puncture resistance of a film may be determined using a Sintech Tensile Testing Unit with a 50 pound Load Cell (commercially available from MTS Systems Corporation of Eden Prairie, Minn.). Puncture resistance is determined as follows: Using the Sintech Tensile Testing Unit, a probe of a specified diameter is used to puncture a film specimen that has been in the load cell. The force required to puncture the film and the resulting displacement is recorded as a measure of puncture resistance.

EXPERIMENTAL

The composite substrate of the present invention will be further described with reference to the following non-limiting examples. All weight percentages specified herein are based on the weight of the respective film layer, unless specified otherwise.

Example 1

Control

An opaque, oriented, five-layer film having an A/B/C/D/E structure is prepared as a control film. The A layer is an outer skin layer (4 ga.) comprising an EVOH polymer (Eval G176B from Kuraray Company Ltd. of Japan). The B layer is a tie layer (12 ga.) comprising 50 wt % of an adhesive resin (Admer AT1179A) and 50 wt % of Total 3371 isotactic polypropylene homopolymer resin (Total 3371). The C layer is a core layer comprising 90 wt % of an isotactic polypropylene homopolymer (Total 3371) and 10 wt % PBT cavitating agent. The D layer is a tie layer (12 ga.) comprising 100 wt % Total 3371. The E layer is a sealant layer (5 ga.) comprising an EPB terpolymer (JPC XPM7794 from JPC Company). This film has a target polygauge thickness of 0.9 mil and a 1.1 mil target optical gauge.

Example 2

Control

An opaque, oriented, five-layer film having an A/B/C/D/E structure is prepared. The A layer is an outer skin layer (4 ga.) comprising an EVOH polymer (Eval G176B from Kuraray Company Ltd. of Japan). The B layer is a tie layer (9 ga.) comprising 50 wt % of an adhesive resin (Admer AT1179A) and 50 wt % of 3371 isotactic polypropylene homopolymer resin (Total 3371). The C layer is a core layer comprised of about 83 wt % Total 3371, 10 percent first polymer (Adflex T100F "Cataloy™," an EP copolymer having a relatively high elastomer content, from Basell Company), and 10 wt % calcium carbonate. The D layer is a tie layer (15 ga.) comprising 100 percent Total 3371. The E layer is a sealant layer (10 ga.) comprising an EPB terpolymer (JPC XPM7800 from JPC Company) and 1.2 wt % silicone oil (migratory slip agent) and 2300 ppmw of an anti-blocking agent (Sylobloc 44 from Grace Davison Products) processing additive. This film has a 0.9 mil polygauge target and a 1.1 mil optical gauge target. Thus, the C layer (core layer) and the D layer (tie layer) differ from those in Example 1. This control example demonstrates that the presence of the first polymer in the core layer does provide some improvement in seal strength over the film of Example 1.

Example 3

An opaque, oriented, five-layer film having an A/B/C/D/E structure is prepared according to an embodiment of the present invention. The A layer is an outer skin layer (4 ga.) comprising Eval G176B (EVOH). The B layer is a tie layer (12 ga.) comprising 50 wt % of an adhesive resin (Admer AT1179A, from Mitsui Polymers) and 50 wt % of Total 3371. The C layer is a core layer comprised of about 84 wt % Exxon 4612 PP, about 10 wt % Adflex T100F Catalloy™ EP copolymer as a first polymer, and about 6 wt % calcium carbonate as a cavitating agent. The D layer is a tie layer (15 ga.) comprising 25 wt % Exxon 4612 and 75 wt % Basell Adflex T100F as a first polymer. The E layer is a sealant layer (10 ga.) comprising JPC XPM7800 EPB terpolymer from JPC Company, 1.2 wt % silicone oil, and 2300 ppm Sylobloc 44. This film has a 0.9 mil polygauge target and a 1.1 mil optical gauge target. Thus, the C layer (core layer) and D layer (tie layer) differ from that in Control Examples 1 and 2 in that layers C and D each include a first polymer.

The results of the evaluation of the multi-layer films of Examples 1, 2, and 3 are shown in Table I.

TABLE I

| Example | Min. Seal Temperature @ 100 gm ASKCO Sealer 5 psi, 2 sec. dwell time | Seal Strength @ 230° F. ASKCO Sealer 5 psi, 2 sec. dwell time | Min. Seal Temperature @ 200 gm WRAPADE Crimp Sealer 20 psi, 0.75 sec. dwell time | Seal Strength @ 190° F. WRAPADE Crimp Sealer 20 psi, 0.75 sec. dwell time | Min. Seal Temperature @ 200 gm LAKO Sealer 60 psi, 0.75 sec. dwell time | Seal Strength @ 210° F. LAKO Sealer 60 psi, 0.75 sec. dwell time |
|---|---|---|---|---|---|---|
| Example 1 (Control) | 224.2° F. | 210 gm/in | 188.5° F. | 225 gm/in | 195.2° F. | 420 gm/in |
| Example 2 (Control) | 220.3° F. | 255 gm/in | 183.6° F. | 318 gm/in | 191.9° F. | 520 gm/in |
| Example 3 | 203.3° F. | 540 gm/in | 178.8° F. | 545 gm/in | 183.8° F. | 836 gm/in |

As shown in Table I, the addition of first polymer to the C core layer and D tie layer in Example 3 results in lower minimum sealing temperatures and higher seal strengths as compared to the control films.

Examples 4 through 7 pertain to relatively thicker films than Examples 1 through 3.

Example 4

Control

A white, oriented five-layer film having an A/B/C/D/E structure is prepared. The A layer is an outer skin layer (3 ga.) comprising an HDPE (M6030) from Equistar with stabilizers and processing aids and is corona treated to a surface energy of at least 42 dynes. The B layer is a tie layer (12 ga.) comprising about 92 wt % Total 3371 and 8 wt % of a polymer masterbatch containing titanium dioxide (TiO$_2$). (Each of the TiO$_2$-containing masterbatches referenced in this document comprises approximately 50 wt % TiO$_2$ and about fifty wt % of polypropylene polymer and related additives.) The C layer is a core layer comprising Exxon 4612 propylene polymer and about 6 wt % PBT (GE Valox 295) cavitating agent. The D layer is a tie layer (12 ga.) comprising Total 3371. The E layer is a sealant layer (10 ga.) comprising JPC XPM7800 EPB terpolymer in addition to 1.2 wt % silicone oil and 2300 ppmw of Sylobloc 44. This film has a 4.2:1 machine direction orientation (MDX), a 2.00 mil polygauge target and a 2.70 mil optical gauge target.

Example 5

A white, oriented five-layer film having an A/B/C/D/E structure is prepared according to the present invention. The A layer is an outer skin layer (3 ga.) comprising a high density polyethylene (M6030 from Equistar, including stabilizers and processing aids) and is corona treated at greater than 42 dynes/cm. The B layer is a tie layer (12 ga.) comprising about 92 wt % Total 3371 and 8 wt % of Ampacet 511094, a masterbatch containing about 50 wt % polypropylene and about 50 wt % titanium dioxide (TiO$_2$). The C layer is a core layer comprising about 79 wt % of Exxon 4612 isotactic polypropylene, 15 wt % first polymer (Adflex 7353XEP from Basell Company), and about 6 wt % PBT. The D layer is a tie layer (12 ga.) comprising 75 wt % Adflex 7353XEP and 25 wt % Total 3371 polypropylene. The E layer is a sealant layer (10 ga.) comprising JPC XPM7800 terpolymer in addition to 1.2 wt % silicone oil and 2300 ppmw of Sylobloc 44. This film has a 4.2:1 machine direction orientation (MDX), a 2.00 mil polygauge target and a 2.70 mil optical gauge target.

Example 6

A white, oriented, five-layer film having an A/B/C/D/E structure is prepared according to an embodiment of the present invention. The A layer is an outer skin layer (3 ga.) comprising Total 8573HB EP copolymer. The B layer is a tie layer (12 ga.) comprising about 90 wt % Total 3371 and 10 wt % of Ampacet 511094 masterbatch containing titanium dioxide (about 50 wt % TiO$_2$ and about fifty wt % of polypropylene polymer and related additives). The C layer is a core layer comprising about 84 wt % of Exxon 4612, 10 wt % of Adflex T100F, as a first polymer, and about 6 wt % PBT. The D layer is a tie layer (12 ga.) comprising 65 wt % of Adflex T100F as a first polymer, 25 wt % Total 3371, and 10 wt % of masterbatch containing titanium dioxide (TiO$_2$). The E layer is a sealant layer (10 ga.) comprising JPC XPM7800, 1.2 wt % silicone oil, and 2300 ppm of Sylobloc 44 (available from Grace Davison Products, Columbia, Md.). This film has a 4.2:1 MDX, a 2.00 mil polygauge target, and a 2.70 mil optical gauge target.

The results of the evaluation of the multi-layer films of Examples 4, 5, and 6 are shown in Table II.

TABLE II

| Example | Minimum Seal Temperature @ 200 gm WRAPADE Crimp Sealer 20 psi, 0.75 sec. Dwell time | Seal Strength @ Temperature (° F.) WRAPADE Crimp Sealer 20 psi, 0.75 sec. dwell time |
|---|---|---|
| Example 4 (Control) | 170.6° F. | 620 gm/in @ 180° F. |
| Example 5 | 164.3° F. | 1373 gm/in @ 180° C. |
| Example 6 | 163° F. | 1107 gm/in @ 190° F. |

As shown in Table II, the addition of a first polymer to the C layer (core layer) and the D layer (tie layer) in Examples 5 and 6 provides substantial seal strength improvement over the control samples. Additionally, the addition of the first polymer effectively reduced the minimum seal temperature. Note also that Control Example 4 reflects improved seal strength relative to Control Example 1. This is due in large part to the greater sealant layer thickness and greater core layer thickness in Example 4.

Table III below provides additional experimental test data for several five-layer film embodiments according to the present invention. Each embodiment is represented by a Sample No., and the corresponding description of the polymer resin components in each of a core layer, the (first) tie layer, and sealant layer is provided in Table III. The target thickness for each of the produced five layer films is 0.90 mil, 90 gauge units, or 22.9 μm. Layer thickness for the sealant skin layer and the tie layer are provided in the table with the balance of the thickness provided by the core layer, the second tie layer, and the outer skin layer. Layer thickness is provided in gauge units, with 100 gauge units equal to one mil., which is roughly equal to 25.4 micrometers. Percentages are weight percents based upon the component weight in the respective layer. Seal strength measurements represent the average seal strength, in grams per inch of seal, from a crimp seal that was made using a WRAP-ADE crimp sealer with a Brugger profile, 20 psi pressure, and 0.75 seconds of dwell time. Minimum seal temperature (MST) is the average minimum seal temperature required to effect a seal strength of 200 grams per inch with a crimp seal applied at 20 psi of pressure and 0.75 seconds of dwell time.

The core layer base resins that were tested include Exxon 4712, an isotactic polypropylene homopolymer available from ExxonMobil Chemical, and Total 3371, a polypropylene homopolymer that is less isotactic than the Exxon 4712. The core layer comprises a blend of the listed base resin plus the stated weight percentage of the indicated first polymer type of resin. Two embodiments of the sealant skin layer were tested as disclosed in Table III. One embodiment comprises an EPB terpolymer, (JPC XPM7800, from JPC Resins), plus 1.2% silicone oil, and 2300 ppmw of Sylobloc 44. The other sealant skin embodiment comprises the same components as the first embodiment with the addition of about 25 wt % of an ethylene vinyl acetate copolymer (EVA), Escorene LD-708 available from ExxonMobil Chemical. The tie layer embodiments comprise substantially 100 wt % of the first polymer type of resin as stated in the table under the heading "Tie Layer Resin." The tested first polymer type resins include Adflex 7353XEP (T100F), an EP copolymer from Basell Polymers, and FINAPLAS-1471, a syndiotactic polypropylene copolymer from Total Chemical, having a lower crystallinity and narrower molecular weight distribution than many isotactic polypropylenes. The skin layer in each sample comprises Total 8573 a polypropylene copolymer that has been flame treated to a target surface energy of 40 dynes. The second tie layer comprises the same base polymers as used the corresponding core layer, namely either the Total 3371 or the Exxon 4712.

In addition to the samples in Table III that comprise a first polymer type of resin in both the core layer and the tie layer, one reference sample was produced, Sample No. A, that includes first polymer type of resin blended in the core layer but having a first tie layer comprising Total 3371 polypropylene with no first polymer type of resin in the tie layer.

TABLE III

| Sample No. | Test Reference No. | Core layer Polymer | Sealant Layer Thickness | EVA in Terpolymer Sealant Layer? | First polymer in Core | First polymer wt % in Core | (First) Tie layer First polymer (100%) | Tie layer Thickness | Seal Strength @ 180° F. | Seal Strength @ 200° F. | Seal Strength @ 220° F. | Min. Seal Temp ° F. @ 200 gm |
|---|---|---|---|---|---|---|---|---|---|---|---|---|
| A | 0 (Control) | 3371 | 10 | EVA | Adflex 7353 | 30 | 3371 | n.a. | 190 | 500 | 815 | 180 |
| B | 4 | 4712 | 7 | EVA | Adflex 7353 | 10 | Adflex 7353 | 12 | 340 | 870 | 1330 | 175 |
| C | 10 | 4712 | 11 | EVA | Adflex 7353 | 30 | Adflex 7353 | 6 | 398 | 1150 | 1395 | 174 |
| D | 1 | 3371 | 11 | EVA | FINAPLAS-1471 | 10 | Adflex 7353 | 12 | 395 | 1130 | 1690 | 174 |
| E | 3 | 4712 | 11 | EVA | FINAPLAS-1471 | 30 | Adflex 7353 | 12 | 300 | 1100 | 1440 | 176 |
| F | 17 | 3371 | 11 | EVA | FINAPLAS-1471 | 10 | Adflex 7353 | 12 | 488 | 1180 | 1720 | 173 |
| G | 7 | 4712 | 7 | EVA | FINAPLAS-1471 | 10 | Adflex 7353 | 6 | 315 | 860 | 1160 | 175 |
| H | 12 | 4712 | 7 | EVA | Adflex 7353 | 30 | FINAPLAS-1471 | 6 | 40 | 640 | 1240 | 192 |
| I | 6 | 4712 | 7 | EVA | FINAPLAS-1471 | 30 | FINAPLAS-1471 | 12 | 48 | 370 | 1700 | 194 |
| J | 13 | 4712 | 11 | EVA | FINAPLAS-1471 | 10 | FINAPLAS-1471 | 6 | 45 | 740 | 1450 | 190 |
| K | 9 | 3371 | 7 | No EVA | Adflex 7353 | 30 | Adflex 7353 | 12 | 643 | 1480 | 2190 | 172 |
| L | 11 | 3371 | 11 | No EVA | Adflex 7353 | 10 | Adflex 7353 | 6 | 543 | 1160 | 1720 | 172 |
| M | 8 | 3371 | 7 | No EVA | FINAPLAS-1471 | 30 | Adflex 7353 | 6 | 288 | 1120 | 1895 | 176 |
| N | 15 | 3371 | 11 | No EVA | FINAPLAS-1471 | 10 | Adflex 7353 | 12 | 575 | 1390 | 2250 | 173 |
| O | 14 | 3371 | 11 | No EVA | Adflex 7353 | 30 | FINAPLAS-1471 | 12 | 55 | 1410 | 1520 | 191 |
| P | 16 | 3371 | 7 | No EVA | Adflex 7353 | 10 | FINAPLAS-1471 | 6 | 38 | 450 | 600 | 193 |
| Q | 5 | 3371 | 7 | No EVA | FINAPLAS-1471 | 10 | FINAPLAS-1471 | 12 | 45 | 300 | 1040 | 196 |
| R | 2 | 4712 | 11 | No EVA | FINAPLAS-1471 | 30 | FINAPLAS-1471 | 6 | 50 | 600 | 1060 | 192 |
| S | 18 | 4712 | 11 | No EVA | FINAPLAS-1471 | 30 | FINAPLAS-1471 | 6 | 48 | 720 | 1010 | 191 |

The data in Table III demonstrates that the first polymer components provided in the core and tie layer can improve seal strength and may, in some embodiments, reduce the MST, relative to a film comprising more crystalline-type polymers in the core and tie layers.

The data in each of the above exemplary experiments on Sample Nos. B through S demonstrate seal strengths of greater than about 500 grams per inch, some greater than about 1000 grams per inch, and some greater than about 1500 grams per inch, for a seal of the sealant layer to itself. In some embodiments, the minimum seal temperature of the multi-layer films of this invention are preferably less than or equal to about 200° F. (93° C.), more preferably less than or equal to about 180° F. (82.2° C.), even more preferably less than or equal to about 176° F. (80.0° C.), and most preferably less than or equal to about 170° F. (76.7° C.).

The inventive developments allow a multi-layer polymer film substrate to replace the two inner plies of the tandem extrusion laminations. In the inventive composite structures described below, the outer two layers, e.g., the paper and PE, provide essentially similar functionality as in the incumbent structure. However, the new inner substrate may provide foil-like barrier properties (see Tables below) without the flex crack/pinhole, etc., issues. This new packaging structure also provides sealing properties similar to the polyethylene it replaces, plus the ability to reduce the cost of laminating through the elimination of the step of extrusion of a polyethylene sealant layer as required on the incumbent structure.

Testing has demonstrated that the inventive flexible packaging structure may be a suitable replacement for the two inner plies of some traditional incumbent structures, e.g., the foil and poly (PE) sealant layers. The data in Tables IV and V illustrate the performance of typical structures for the incumbent packaging structure compared to packaging structures according to this invention. Particularly, the data in Table IV illustrates a deficiency of the traditional incumbent laminated foil bearing packaging structure. The first example is of a typical incumbent paper/poly/foil/poly structure and illustrates how the barrier properties of the foil barrier layer can break down when the substrate is subjected to a number of flexures, such as may occur during and subsequent to packaging operations. The data clearly illustrates how oxygen and water vapor transmission increases substantially after just 15 flexes of the structure.

However, the second example of Table IV exhibits test results on a film embodiment according to the present invention and illustrates that although there may be some reduction in barrier quality subsequent to 15 flexes, the reduction is relatively minor and the barrier properties of the packaging structure remain well within acceptable limits. The result may be a substantial increase in product shelf life, as well as a reduction in costs and time in preparing the subject inventive packaging structure.

In the examples below in Tables IV and V, the "25# C1S Paper" is 25 lb./ream, bleached white kraft paper that is coated on one side with a clay-based coating to make it smooth and printable, as is widely available from many commercial pulp and paper vendors. Exemplary "Film A" in the examples in Tables IV and V below is a multi-layer polymer film prepared according to this invention and generally comprises a five-layer white opaque thermoplastic OPP film including a core layer and tie layer each comprising a first polymer component therein, and also including a second tie layer on an opposite side of the core layer from the first tie layer, and including a sealant layer on the sealable side of the film and a skin layer on the opposite outermost surface of the film. The film is metallized on the outer surface of the film, on the side of the core layer opposite the first tie layer and includes a coating, such as a polyvinylidene chloride (PVdC) or ethylene-vinyl alcohol (EVOH), on the metal layer. After metallization and coating, the multi-layer film was laminated to the kraft paper by extrusion lamination using low density polyethylene as the laminating bond layer or adhesive.

TABLE IV

Barrier Properties vs. Gelbo Flex

| Structure | Oxygen TR: cc/100 in$^2$/ 24 hr Flat Sheet | Oxygen TR: cc/100 in$^2$/ 24 hr After 15 flexes | WVTR: g/100 in$^2$/ 24 hr Flat Sheet | WVTR: g/100 in$^2$/ 24 hr After 15 Flexes |
|---|---|---|---|---|
| 25# C1S paper/5# LDPE/.00025 foil/14# | 0.003 | >130 | 0.010 | 0.03 |

TABLE IV-continued

Barrier Properties vs. Gelbo Flex

| Structure | Oxygen TR: cc/100 in$^2$/ 24 hr Flat Sheet | Oxygen TR: cc/100 in$^2$/ 24 hr After 15 flexes | WVTR: g/100 in$^2$/ 24 hr Flat Sheet | WVTR: g/100 in$^2$/ 24 hr After 15 Flexes |
|---|---|---|---|---|
| PE (Control - Comparative) | | | | |
| 25# C1S paper/5# LDPE/Film A (Exemplary) | 0.006 | 0.153 | 0.015 | 0.04 |

Table V compares the seal strengths of an incumbent prior art packaging structure and inventive packaging structure of Table IV. The data in Table V illustrates that, although seal strengths of incumbent structures utilizing polyethylene inner seal layers have seal strengths of about 2000 g/in and burst strengths in excess of 6 psig. The inventive packaging structure also exhibits a comparably high seal strength and burst strength. The inventive packaging structure provides acceptable seal strengths and burst strengths approaching those available with polyethylene seals, through a much simpler and cost competitive inventive film structure.

TABLE V

Sealing Characteristics

| Structure | Seal Strength: (Finished pouch) g/in | Mocon Burst Strength: (Finished pouch) PSI |
|---|---|---|
| 25# C1S paper/5# LDPE/.00025 foil/14# PE (Control - Comparative) | 2200 | >6.0 |
| 25# C1S paper/5# LDPE Film A (Exemplary) | 1660 | >5.0 |

Additional seal test data (duplicative and not presented herein) demonstrates that the inventive packaging structure performs acceptably during use in preparing and filling pouch type packages. Pouches were prepared on a Klockner Bartlet™ pouch machine and filled with a variety of powdery products. The incumbent paper and foil based structures, e.g., Paper/Poly/Foil/Poly, were compared in each case, against packaging structure according to this invention. The seal strengths of unfilled pouches were compared to the seal strengths of pouches that were filled and thereby exposed to potential powdery-contamination by products, such as spices, drink mixes, gelatin mixes, ground coffee, etc. The incumbent foil-poly structures demonstrated seal strength reductions of generally less than 10%, which may be considered acceptable performance. The inventive packaging structures demonstrated similar performance, exhibiting virtually no reduction in seal strength when comparing the seal strength of empty packages versus the seal strength of the filled packages. This demonstrates that the inventive packaging structure provides acceptable packaging performance and offers a sealable, flexible packaging alternative to the incumbent structures.

Tables IV and V demonstrate that the inventive structure also provides superior oxygen barrier properties as compared to a foil structure that has been flexed or otherwise distorted during processing. The water vapor barrier properties for the flexed inventive film samples performed substantially comparable to the water barrier properties of the incumbent structure. Inventive embodiments have also been tested that demonstrated improved barrier properties after flexing (e.g., lower WVTR values), as compared with the flexed WVTR values of the incumbent films. Also, the data demonstrates that seal strength and burst strength of the tested inventive seals are comparable to the incumbent films. Thus, the data demonstrates that the inventive film structure performs substantially as well as the previous best incumbent structure available in the industry (e.g., a foil barrier and polyethylene sealant layer). However, the inventive film also offers the added benefits of simplified construction, potential lower costs, easier packaging substrate preparation, wider availability due to not needing tandem lamination, and improved packaged product shelf life. The inventive film thus offers an attractive replacement and alternative packaging structure for many flexible packaging applications using sealable high-barrier polymeric films.

The present invention is described herein with reference to embodiments of multi-layer films having layers containing polymer blends comprised of one or more first polymers with one or more tie layers comprising first polymers. Other various film structures including these components are also contemplated. Those skilled in the art will appreciate that numerous modifications to these embodiments may be made without departing from the scope of our invention. For example, while certain film layers are exemplified as being comprised of specific polymer blends and additives, along with certain arrangement of layers within the film, other compositions and arrangements are also contemplated. Additionally, while packaging is discussed as among the uses for embodiments of our inventive films, other uses, such as labeling and printing, are also contemplated.

To the extent that this description is specific, it is solely for the purpose of illustrating certain embodiments of the invention and should not be taken as limiting the present inventive concepts to these specific embodiments. Therefore, the spirit and scope of the appended claims should not be limited to the description of the embodiments contained herein.

What is claimed is:
1. A sealable composite flexible packaging structure comprising:
    (a) a first substrate, wherein the first substrate comprises paper, cloth, polymeric materials, cardstock or coated paper; and
    (b) a second substrate comprising a multi-layer film including at least:
        (1) a core layer comprising from 60 wt % to 95 wt % of a core polymer and from 5 wt % to 40 wt % of a first polymer, wherein the core polymer comprises a first isotactic polypropylene;
        (2) a sealant layer, wherein said sealant layer comprises co- or terpolymers of ethylene, propylene, and butylenes; and
        (3) a first tie layer intermediate the core layer and the sealant layer, the first tie layer is on a side of the core layer opposite the first substrate, the first tie layer comprising the first polymer and a second isotactic polypropylene having a molecular weight distribution greater than the molecular weight distribution of the first isotactic polypropylene;
    wherein the first substrate is adhered to the second substrate on a side of the second substrate opposite the tie layer, the first substrate is adhered to the second substrate by at least one of lamination, coating, and coextrusion;
    wherein the DSC melting point temperature of the core layer is greater than the DSC melting point temperature of the tie layer; and
    wherein the sealable composite flexible packaging structure does not contain an inner layer of foil.

2. The composite structure of claim 1, wherein the second substrate is metallized by vapor deposition on a side of the core layer opposite the first tie layer.

3. The composite structure of claim 1, wherein the core layer is cavitated.

4. The composite structure of claim 1, wherein the second substrate further comprises:
    a skin layer on a side of the core layer opposite the first tie layer, the skin layer comprising a polymer selected from the group consisting of polyethylene (PE), polypropylene (PP), ethylene-propylene (EP) copolymer, ethylene-propylene-butylene (EPB) terpolymer, an ethylene-vinyl alcohol (EVOH) polymer, and blends thereof.

5. The composite structure of claim 4, wherein the second substrate further comprises a second tie layer intermediate the skin layer and the core layer.

6. The composite structure of claim 5, wherein the first substrate is adhered to the second substrate by at least one of adhesive lamination and extrusion lamination.

7. The composite structure of claim 6, wherein the lamination is extrusion lamination and the laminating extrudate comprises polyethylene.

8. The composite structure of claim 7, wherein the skin layer is metallized.

9. The composite structure of claim 8, wherein the skin layer or the metallized skin layer is coated with at least one coating selected from the group consisting of EVOH, acrylic polymers, polyvinylidene chloride (PVdC), ethylene acrylic acid copolymers (EAA), ethylene methyl acrylate copolymers (EMA), or poly(vinyl)alcohol (PVOH), and combinations thereof.

10. A sealable composite flexible packaging structure having oxygen transmission and water barrier properties, comprising:
    (a) a first substrate, wherein the first substrate comprises paper, cloth, polymeric materials, cardstock or coated paper; and
    (b) a second substrate comprising a multi-layer film including at least:
        (1) a cavitated core layer comprising from 60 wt % to 95 wt % of a core polymer and from 5 wt % to 40 wt % of a first polymer, wherein the core polymer comprises a first isotactic polypropylene;
        (2) a sealant layer, wherein said sealant layer comprises co- or terpolymers of ethylene, propylene, and butylenes;
        (3) a first tie layer intermediate the core layer and the sealant layer, the first tie layer is on a side of the core layer opposite the first substrate, the first tie layer comprising the first polymer and a second isotactic polypropylene having a molecular weight distribution greater than the molecular weight distribution of the first isotactic polypropylene;
        (4) a second tie layer intermediate the skin layer and core layer;
        (5) a skin layer on a side of the core layer opposite the first tie layer, wherein the skin layer is metallized; and
        (6) a coating layer applied to the sealant layer;
    wherein the first substrate is extrusion laminated to the second substrate on a side of the second substrate opposite the first tie layer, the laminating extrudate comprises polyethylene; and wherein the oxygen transmission and water barrier properties are substantially maintained after the sealable, composite flexible packaging structure is subjected to flexures during packaging operations.

11. The composite structure of claim 10, wherein the oxygen transmission rate is less than 0.15 cc/100 in$^2$/24 hr and the water vapor transmission rate is less than 0.04 g/100 in$^2$/24 hr after the composite structure is subjected to 15 flexures.

12. The composite structure of claim 10, wherein the sealable composite structure is formed as a package or pouch.

13. The composite structure of claim 1, wherein the first polymer comprises a propylene-ethylene copolymer including from about 75 wt % to about 96 wt % propylene and from about 4 wt % to about 25 wt % ethylene, wherein the ethylene-propylene copolymer has a density in the range from 0.850 g/cm$^3$ to 0.920 g/cm$^3$, a DSC melting point in the range of from 60° C. to 148° C., a heat of fusion less than 75 J/g, crystallinity from 2% to 65%, and a molecular weight distribution less than or equal to 3.2.

14. The composite structure of claim 10, wherein the first polymer comprises a propylene-ethylene copolymer including from about 75 wt % to about 96 wt % propylene and from about 4 wt % to about 25 wt % ethylene, wherein the ethylene-propylene copolymer has a density in the range from 0.850 g/cm$^3$ to 0.920 g/cm$^3$, a DSC melting point in the range of from 60° C. to 148° C., a heat of fusion less than 75 J/g, crystallinity from 2% to 65%, and a molecular weight distribution less than or equal to 3.2.

15. The sealable composite flexible packaging structure of claim 1, wherein the second isotactic polypropylene has a molecular weight distribution at least 1.0 greater than the molecular weight distribution of the first isotactic polypropylene.

16. The sealable composite flexible packaging structure of claim 15, wherein the second isotactic polypropylene has a molecular weight distribution about 1.0 greater than the molecular weight distribution of the first isotactic polypropylene.

17. The sealable composite flexible packaging structure of claim 16, wherein the second isotactic polypropylene has a molecular weight distribution of about 5.8 and the first isotactic polypropylene has a molecular weight distribution of about 4.8.

* * * * *